Aug. 12, 1958     G. A. LYON     2,847,254
WHEEL COVER
Filed Dec. 27, 1954
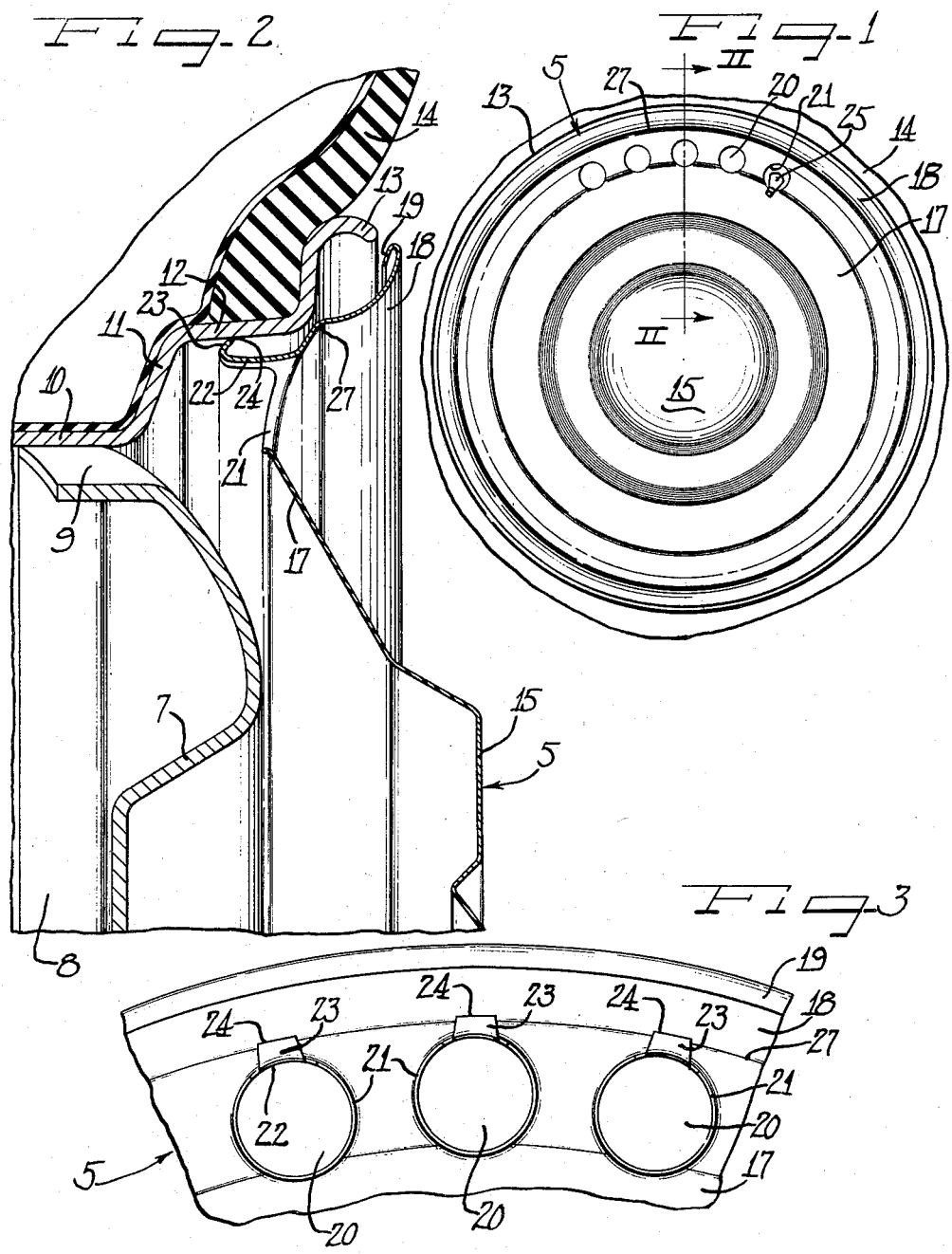
Inventor
George Albert Lyon

United States Patent Office 2,847,254
Patented Aug. 12, 1958

2,847,254

WHEEL COVER

George Albert Lyon, Detroit, Mich.

Application December 27, 1954, Serial No. 477,774

5 Claims. (Cl. 301—37)

The present invention relates to improvements in wheel structures and more particularly concerns the ornamental and protective covering of the outer sides of vehicle wheels.

An important object of the present invention is to provide an improved wheel structure having a cover for the outer side thereof providing for air circulation therethrough and having novel retaining means thereon.

Another object of the invention is to provide a cover for the outer side of a vehicle wheel with improved cover retaining finger means on the cover.

A further object of the invention is to provide a novel one piece cover structure.

Other objects, features and advantages of the present invention will be readily apparent from the following detailed description of a preferred embodiment thereof taken in conjunction with the accompanying drawing in which:

Figure 1 is an outer side elevational view of a wheel structure embodying the features of the invention;

Figure 2 is an enlarged fragmentary radially sectional view taken substantially on the line II—II of Figure 1; and Figure 3 is a fragmentary rear elevational view of an outer marginal portion of the cover.

A cover 5 is adapted to be applied to the outer side of a vehicle wheel including a wheel body 7 having a radially outer marginal attachment flange 8 inset at suitable intervals such as four to provide wheel openings 9 for circulation of air through the wheel for cooling a brake drum (not shown) with which the wheel may be associated in service.

The attachment flange 8 is secured in suitable fashion to a base flange 10 of a multi-flange, drop center tire rim having at the outer side thereof a generally radially outwardly and axially outwardly sloping side flange 11 merging with a generally axially outwardly extending and radially outwardly sloping intermediate flange 12 joining a generally radially outwardly and then axially outwardly turned terminal flange 13. A tire and tube assembly 14, or a tubeless tire is adapted to be supported by the tire rim.

In the present instance, the cover 5 is shown as a full disk cover of a diameter to substantially cover the entire wheel including the wheel body 7 and the tire rim. On the other hand, if desired, the cover 5 may be in the form of a trim, that is an annular structure for covering the tire rim and the adjacent portion of the wheel body. In any event, the term "cover" should be construed to mean either an annular trim or ring or a full disk cover.

In the cover shown, a central crown portion 15 is provided for overlying the central portion of the wheel body 7 and having an intermediate generally inwardly dished portion 17 for overlying the juncture area between the wheel body and the tire rim. An outer marginal generally radially and axially outwardly directed annular rib-like marginal portion 18 of the cover is arranged to substantially overlie the terminal flange 13 and has an underturned reinforcing and finishing bead 19 adapted in service to lie in spaced relation to the tip of the terminal flange of the tire rim.

For circulation of air through the cover 5 and in order to provide cover retaining means, the generally dished intermediate portion 17 of the cover is provided with a uniform annular series of spaced openings 20 therethrough each of which is provided preferably about its entire circumference with a generally axially inwardly directed reinforcing flange 21. As shown, the apertures 20 and the reinforcing flanges 21 may be of circular or substantially circular form. The apertures 20 are located generally opposite the wheel openings 9 so that air may circulate through the openings 20 and the wheel openings 9.

The radially outermost portions of the cover openings 20 are preferably located on a diameter which is substantially smaller than the inside diameter of the intermediate flange 12 of the tire rim, and at preferably each of the openings 20 cover retaining generally axially inwardly extending fingers 22 are provided which are preferably formed as continuous one piece inward extensions from the reinforcing marginal flange 21 in each instance. The finger extensions 22 are derived from material struck out in forming the openings 20.

By having the retaining fingers 22 of transversely arcuate form generally conformable to the arcuate shape of the conjoined re-enforcing flange 21, substantial resilient rigidity is afforded in the retaining fingers 22 resisting radial flexure. For retaining engagement with the tire rim, each of the retaining fingers 22 is provided with a short and stiff obliquely angular generally radially and axially outwardly directed retaining terminal 23 having a retaining tip 24 which is engageable in gripping retaining edgewise relation against the intermediate flange 12 of the tire rim. In the normal position thereof, the tips 24 of the retaining fingers extend to a diameter which is somewhat greater than the inside diameter of the axially outer portion of the intermediate flange 12 of the tire rim. Accordingly, in applying the cover 5 to the wheel it is pressed axially inwardly onto the wheel and the retaining finger terminals 23 cam inwardly along the sloping inner face of the intermediate flange 12 and the retaining finger bodies are resiliently flexed radially inwardly to thereby apply gripping thrusting tension of the tips 24 against the intermediate flange.

By having the sides of the retaining fingers 22 flaring to a greater width at their juncture with the reinforcing flanges 21, substantial resistance to radially inward flexure of the fingers 22 is afforded by the angular wing-like sides of the fingers. In effect, the reinforcing flanges 21 associated with the respective retaining fingers 22 become integral parts of the retaining fingers and coact therewith in affording the desirable radially outward thrust of the tips of the retaining fingers against the tire rim intermediate flange.

In applying the cover to the wheel, a valve stem 25 projecting from the side flange 11 is adapted to extend for access through one of the openings 20 as shown in Figure 1.

Removal of the cover 5 from the wheel is effected by inserting a pry-off tool behind the outer reinforcing flange bead 19 and exerting pry-off leverage, and as the cover yields by radially inward movement in response to the pry-off force, as enabled by yielding of the fingers 22, additional pry-off leverage closer to the fingers can be exerted against a radially inner pry-off annular inwardly directed rib 27 which normally lies adjacent to the juncture shoulder between the intermediate flange 12 and the terminal flange 13 of the tire rim.

It will be understood that modifications and variations may be effected without departing from the scope of the novel concepts of the present invention.

I claim as my invention:

1. In a wheel structure including a wheel body and a tire rim with openings through the wheel for air circulation, a cover for disposition at the outer side of the wheel having a portion thereof to lie opposite the wheel openings in substantially spaced relation to the portion of the wheel with the openings, and said cover portion having a series of spaced openings therein adjacent to the tire rim with arcuate flanges defining the openings and having generally axially inward extensions from said flanges providing retaining fingers engageable with the tire rim for retaining the cover on the wheel, said retaining finger extensions being transversely arcuate for resilient stiffness and having the sides thereof flaring into merger with the arcuate flanges.

2. In a wheel structure including a tire rim and a wheel body with wheel openings adjacent juncture of the body and tire rim, a cover for disposition at the outer side of the wheel including a circular cover member having relatively divergently related inner and outer circular portions with an intermediate inwardly dish portion to lie opposite the wheel openings, said inwardly dish portion of the cover having an annular series of spaced circular openings defined by axially inwardly directed circular reinforcing flanges thereabout, said reinforcing flanges having at the radial outer sides thereof adjacent to the tire rim generally axially inwardly extending retaining fingers disposed normally to lie adjacent to a flange of the tire rim and provided with short and stiff generally radially and axially outwardly oblique retaining terminals engageable in press-on, pry-off relation with the tire rim flange and placing the fingers under resilient radially inwardly deflected tension, said openings in the cover being disposed for air circulation therethrough and through the wheel, and a valve stem projecting from the tire rim and through one of said openings.

3. In a wheel structure including a wheel body carrying a tire rim having an annular generally radially inwardly facing flange and axially outwardly therefrom a generally axially outwardly facing flange portion, with air circulation openings adjacent juncture of the wheel body and the tire rim, a cover for disposition at the outer side of the wheel comprising a circular cover formed from one piece of sheet metal and including a circular radially inner cover portion for overlying the wheel body and a substantially rigid annular radially outer marginal portion for overlying the axially outwardly facing rim portion with an intermediate annular inwardly dished portion for overlying the radially facing rim flange, said intermediate cover portion having an annular series of openings of substantial diameter therethrough provided entirely thereabout with generally axially inwardly directed reinforcing flanges pressed from material of the cover in forming the openings and with the radially outer side portions of said flanges located adjacent to but spaced radially inwardly from the axially outer portion of said radially inwardly facing rim flange, said radially outer portions of the cover opening flanges having extending generally axially inwardly therefrom retaining fingers with axially inwardly elongated body portions lying on a diameter smaller than the inside diameter of said radially facing rim flange, each of said fingers having a generally radially outwardly turned inner end extremity portion retainingly engageable under resilient tension of the finger bodies with the radially facing rim flange for retaining the cover on the wheel, said retaining engagement of the cover maintaining the cover in substantial axially outward spaced relation to the juncture of the wheel body and the tire rim and with said cover openings located axially and radially outwardly substantially spaced from the wheel openings and adjacent to juncture of the radially inwardly facing rim flange and the axially outwardly facing rim portion for effective circulation of air through the wheel openings and the cover openings.

4. In a wheel structure including a wheel body carrying a tire rim having an annular generally radially inwardly facing flange and axially outwardly therefrom a generally axially outwardly facing flange portion, with air circulation openings adjacent juncture of the wheel body and the tire rim, a cover for disposition at the outer side of the wheel comprising a circular cover formed from one piece of sheet metal and including a circular radially inner cover portion for overlying the wheel body and a substantially rigid annular radially outer marginal portion for overlying the axially outwardly facing rim portion with an intermediate annular inwardly dished portion for overlying the radially facing rim flange, said intermediate cover portion having an annular series of openings of substantial diameter therethrough provided entirely thereabout with generally axially inwardly directed reinforcing flanges pressed from material of the cover in forming the openings and with the radially outer side portions of said flanges located adjacent to but spaced radially inwardly from the axially outer portion of said radially inwardly facing rim flange, said radially outer portions of the cover opening flanges having extending generally axially inwardly therefrom retaining fingers with axially inwardly elongated body portions lying on a diameter smaller than the inside diameter of said radially facing rim flange, each of said fingers having a generally radially outwardly turned inner end extremity portion retainingly engageable under resilient tension of the finger bodies with the radially facing rim flange for retaining the cover on the wheel, said retaining engagement of the cover maintaining the cover in substantial axially outward spaced relation to the juncture of the wheel body and the tire rim and with said cover openings located axially and radially outwardly substantially spaced from the wheel openings and adjacent to juncture of the radially inwardly facing rim flange and the axially outwardly facing rim portion for effective circulation of air through the wheel openings and the cover openings, said outer marginal rigid cover portion having adjacent to said cover openings an annular indented pry-off rib spaced radially inwardly from the radially outer edge of the cover and disposed opposite juncture of the radially facing rim flange and axially facing rim portion.

5. In a wheel structure including a wheel body carrying a tire rim having an annular generally radially inwardly facing flange and axially outwardly therefrom a generally axially outwardly facing flange portion, a circular wheel cover for disposition at the outer side of the wheel comprising radially inner and outer portions with an intermediate annular area of the cover therebetween and adjacent to said radially inwardly facing flange of the rim, said intermediate area having an annular series of openings of substantial diameter therethrough provided entirely thereabout with generally axially inwardly directed reinforcing respective flanges pressed from material of the annular area in forming the openings, the radially outer side portions of said flanges being located adjacent to but spaced radially inwardly from the axially outer portion of said radially inwardly facing rim flange, said radially outer side of the flanges being of substantially smaller radius of curvature than the radius of curvature of said radially inwardly facing rim flange and having as integral one-piece generally axially inward extensions therefrom retaining fingers with axially inwardly extending body portions lying on a diameter slightly smaller than the inside diameter of said radially inwardly facing flange, each of said fingers having a generally radially outwardly turned axially inner end extremity portion retainingly engageable under resilient tension of the finger bodies with the radially facing rim flange for retaining the cover on the wheel, said retaining finger bodies being of substantial width and transversely arcuate conformable to the arcuate form of the radially outer portions of the flanges from which the fingers extend integrally, the sides of the fingers flaring toward juncture with the arcuate flanges and thereby comprising generally angularly radially inwardly directed reinforcing and stiffening wings for the retaining fingers for enhancing the resilient tension thereof resulting from engagement of said end extremity portions with the rim flange.

References Cited in the file of this patent

UNITED STATES PATENTS

| | | |
|---|---|---|
| Re. 22,428 | Lyon | Feb. 1, 1944 |
| 2,094,326 | Lyon | Sept. 28, 1937 |
| 2,198,056 | Lyon | Apr. 23, 1940 |
| 2,231,931 | Lyon | Feb. 18, 1941 |
| 2,368,238 | Lyon | Jan. 30, 1945 |
| 2,386,236 | Lyon | Oct. 9, 1945 |